(12) United States Patent
Carl et al.

(10) Patent No.: US 12,139,081 B2
(45) Date of Patent: Nov. 12, 2024

(54) ASSEMBLY OF AN ADJUSTMENT DEVICE OF A MOTOR VEHICLE AND WINDOW OPENER HAVING THE ASSEMBLY

(71) Applicant: Brose Fahrzeugteile SE & Co. Kommanditgesellschaft, Bamberg, Bamberg (DE)

(72) Inventors: Andre Carl, Ebersdorf (DE); Thorsten Kuhnen, Litzendorf (DE); Nima Hakak, Bamberg (DE)

(73) Assignee: BROSE Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 17 days.

(21) Appl. No.: 17/884,738

(22) Filed: Aug. 10, 2022

(65) Prior Publication Data
US 2022/0379824 A1 Dec. 1, 2022

Related U.S. Application Data

(63) Continuation of application No. PCT/EP2021/052354, filed on Feb. 2, 2021.

(30) Foreign Application Priority Data

Feb. 10, 2020 (DE) ..................... 10 2020 201 612.7
Apr. 30, 2020 (DE) ..................... 10 2020 205 551.3

(51) Int. Cl.
E05D 15/00 (2006.01)
B60J 1/17 (2006.01)
(Continued)

(52) U.S. Cl.
CPC ............... *B60R 16/027* (2013.01); *B60J 1/17* (2013.01); *B60R 16/0215* (2013.01);
(Continued)

(58) Field of Classification Search
CPC ......... B60J 1/17; E05D 15/165; E05F 15/697; E05Y 2201/64; E05Y 2201/684; E05Y 2400/654
See application file for complete search history.

(56) References Cited

U.S. PATENT DOCUMENTS 7,076,918 B2 * 7/2006 Tatsumi ................. B60J 5/0416
49/374
7,717,158 B2 * 5/2010 Lekar ..................... B60J 1/2086
160/310

(Continued)

FOREIGN PATENT DOCUMENTS

CN 101242976 A 8/2008
CN 105939003 A 9/2016
(Continued)

Primary Examiner — Daniel J Troy
Assistant Examiner — Daniel Alvarez
(74) Attorney, Agent, or Firm — Laurence A. Greenberg; Werner H. Stemer; Ralph E. Locher

(57) ABSTRACT

An assembly of an adjustment device of a motor vehicle includes a support plate, on which at least one guide rail is disposed. A driver is movably guided on the guide rail, for a functionalized windowpane, in particular an electrically switchable or controllable windowpane. A flexible component is provided for guiding a cable which is connected or can be connected to the functionalized windowpane, in particular for conducting a current and/or for controlling the functionalized windowpane. A window opener of a motor vehicle having the assembly is also provided.

12 Claims, 5 Drawing Sheets

(51) Int. Cl.
*B60R 16/02* (2006.01)
*B60R 16/027* (2006.01)
*E05D 15/16* (2006.01)
*E05F 15/697* (2015.01)

(52) U.S. Cl.
CPC .......... *E05D 15/165* (2013.01); *E05F 15/697* (2015.01); *E05Y 2201/64* (2013.01); *E05Y 2201/684* (2013.01); *E05Y 2400/654* (2013.01); *E05Y 2900/55* (2013.01)

(56) References Cited

U.S. PATENT DOCUMENTS

| | | |
|---|---|---|
| 2008/0196191 A1 | 8/2008 | Jeuffe et al. |
| 2016/0257268 A1 | 9/2016 | Tsubaki |
| 2018/0072139 A1* | 3/2018 | Mueller ................ H05B 3/84 |

FOREIGN PATENT DOCUMENTS

| | | | |
|---|---|---|---|
| DE | 10306758 A1 | 8/2004 | |
| DE | 102009037674 A1 | 2/2011 | |
| DE | 202013100567 U1 | 5/2014 | |
| DE | 202015102718 * | 8/2016 | ............ E05F 11/382 |
| DE | 202015102718 U1 | 8/2016 | |
| WO | 2006063565 A1 | 6/2006 | |
| WO | 2014122139 A1 | 8/2014 | |
| WO | 2014122146 A1 | 8/2014 | |

\* cited by examiner

ASSEMBLY OF AN ADJUSTMENT DEVICE OF A MOTOR VEHICLE AND WINDOW OPENER HAVING THE ASSEMBLY

CROSS-REFERENCE TO RELATED APPLICATION

This application is a continuation, under 35 U.S.C. § 120, of copending International Patent Application PCT/EP2021/052354, filed Feb. 2, 2021, which designated the United States; this application also claims the priority, under 35 U.S.C. § 119, of German Patent Applications DE 10 2020 201 612.7, filed Feb. 10, 2020 and DE 10 2020 205 551.3, filed Apr. 30, 2020; the prior applications are herewith incorporated by reference in their entirety.

FIELD AND BACKGROUND OF THE INVENTION

The invention relates to an assembly of an adjustment device with a functionalized or for a functionalized windowpane of a motor vehicle.

An assembly is understood herein as meaning in particular a door module with a carrier plate or a carrier plate of this type on which components of an, in particular electromotive, window opener, preferably cable-type window opener, are disposed or mounted or can be mounted.

A functionalized windowpane is understood herein and below as meaning in particular an electrically switchable or controllable (motor vehicle) glazed unit, i.e. a windowpane with an electrically switchable or (activatable)/controllable functional layer, in particular an electro-transparent, an antenna-functional, a heatable or an illuminable layer. In other words, an in particular optical and/or thermal functional layer of the windowpane is provided, the functions of which can be influenced, can be changed, can be switched or can be controlled by using electric control signals. A functionalized windowpane is also understood as meaning a shadeable glazed unit in the manner of an electroactive or electrochromic glass (smart glass).

In order to activate functionalized windowpanes of this type, they have to be coupled, for the transmission of the control signals, to an energy source and/or a control device (controller) as electronics. In particular in the case of movable or adjustable windowpanes of a motor vehicle, for example a side windowpane or a sliding roof, the connection in terms of signal transmission between the windowpane and the electronics is associated with a high structural and installation outlay.

In addition, the conducting of lines or of a cable with such lines for the supply of a current and/or signal to the windowpane is frequently associated with complicated aids, for example a lever or an additional slotted guideway, and with a large amount of construction space being required. Added to this are undesirable noise emissions, for example when closing the vehicle door (door slamming).

SUMMARY OF THE INVENTION

It is accordingly an object of the invention to provide a particularly suitable assembly of an adjustment device of a motor vehicle and a window opener having the assembly, which overcome the hereinafore-mentioned disadvantages of the heretofore-known devices of this general type and which have a functionalized or is for a functionalized windowpane of a motor vehicle.

With the foregoing and other objects in view there is provided, in accordance with the invention, an assembly of an adjustment device of a motor vehicle, having
 a carrier plate on which at least one guide rail is disposed,
 a driver which is guided displaceably on the guide rail and is intended for a functionalized, in particular electrically switchable or controllable, windowpane, and
 a flexible component for guiding a cable, which is connected or connectable to the functionalized windowpane, in particular for conducting a current and/or for controlling the functionalized windowpane.

With the objects of the invention in view, there is concomitantly provided a window opener of a motor vehicle, having the assembly according to the invention.

Advantageous refinements and developments are the subject matter of the dependent claims. The advantages and refinements indicated in respect of the assembly can be transferred analogously also to the window opener, and vice versa.

The assembly is part of an adjustment device of a motor vehicle or is such an adjustment device itself, in particular a window opener assembly, having a carrier plate (module carrier, unit module), for example of a door module.

The assembly has at least one guide rail on which a driver (rail slider) is guided. The guide rail, in particular of a single-strand window opener, or else two mutually parallel guide rails, in particular of a two-strand window opener, are disposed (mounted) on or at the carrier plate. A supporting or holding contour is provided or disposed in a suitable manner on the carrier plate, in particular spaced apart from the guide rail.

In the case of a cable-type window opener, an, in particular electromotive, drive (cable drive) is coupled to a cable drum on which a traction cable, which is connected to the or each driver, is wound as a loop in such a way that, during the (window opener) operation, one cable end is unwound from the cable drum and, in particular at the same time, the other cable end is unwound.

Within the context of the invention, a driver is first of all understood generally as meaning a connecting element between the windowpane and the window opener, which driver guides the windowpane adjustably along an adjustment path in order to move the windowpane in the mounted state along the adjustment path between a closed position and an open position (opening point). The windowpane in this case is a functionalized, in particular electrically switchable or controllable, windowpane. The latter expediently has an electric contact point as a terminal connection region.

Furthermore, the assembly has a flexible, in particular elastic, flexurally elastic, flexurally soft and/or elastically deformable component for guiding a cable or lines connected or connectable to the functionalized windowpane. A cable is understood herein as meaning a number of lines, surrounded in particular by a cable or insulating sheath, for conducting a current and/or controlling the windowpane. The cable or the line or lines are coupled in a suitable manner to or at the driver which, for its part, is coupled or connected to, and/or is in electrical contact with, the terminal connection region of the windowpane.

The flexible (elastic) component is preferably configured in the manner of a drag chain and/or as a hollow tube or in the manner of a hollow tube, wherein a round, for example circular or oval, or an angular, for example a rectangular or triangular, profile cross section of the hollow tube is possible. The cable or the or each line is suitably accommodated at least over part of its length, i.e. in sections, in the interior of the flexible component. In addition, the flexible component is manufactured in particular from plastic and/or embodied (configured) as a corrugated tube. The flexible component preferably completely surrounds the corresponding cable or line portion. The cross-sectional area of the component is expediently round, e.g. circular, but may also be angular (rectangular).

In an advantageous refinement, the flexible component is guided on and/or under the guide rail. For this purpose, in a suitable manner, the guide rail has a guide region running in the longitudinal direction of the rail for the component. The guide rail preferably has a guide region running in the longitudinal direction of the rail in the form of a longitudinal groove, a flute or a guide channel in which the flexible component lies, in particular over part of its circumferential or lateral surface.

It is expediently provided that the flexible or elastic component has a first, preferably end-side, component portion which is held on the driver or is connected thereto. Additionally or alternatively, it is provided that the flexible component has a second, preferably end-side, component portion which is held on, or is connected to, the carrier plate or the supporting or holding contour, which is disposed spaced apart the guide rail. The cable lying (accommodated) in the component or the or each line accommodated therein is clamped in a suitable manner to an end-side component portion or to the two end-side component portions, in particular with strain relief, or is connected to the respective end-side component portion. One of the end-side component portions can be a start (component start), in particular for the entry of the cable or of the respective line, and the other end-side component portion can be an end (component end), in particular for the exit of the cable or of the respective line.

In a particularly advantageous refinement, the assembly is constructed, embodied and/or configured in such a manner that the flexible or elastic component has, on the driver side, a movable component portion, in particular a first end portion, and, on the carrier plate side, a (positionally fixed) component portion fixed on the carrier, in particular a second end portion, in such a manner that, when the driver is adjusted along the guide rail in the longitudinal direction of the rail, the movable component portion is adjusted relative to the component portion fixed on the carrier, and/or that, when the driver is adjusted along the guide rail, the movable component portion passes the component portion fixed on the carrier, in particular both in the direction of a closed position and in the direction of an open position of the windowpane, at a distance oriented transversely with respect to the longitudinal direction of the rail. With reference to the typical (conventional) vehicle coordinate system, the movable component portion moving in the z direction passes the component portion fixed on the carrier at a distance extending in the x direction.

It is particularly advantageous in this case that the flexible or elastic component is guided in the x direction and/or in the y direction, preferably both in the x direction and in the y direction, by using the supporting or holding contour and/or by using a guide component, in particular fixed on the carrier.

Other features which are considered as characteristic for the invention are set forth in the appended claims.

Although the invention is illustrated and described herein as embodied in an assembly of an adjustment device of a motor vehicle and a window opener having the assembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
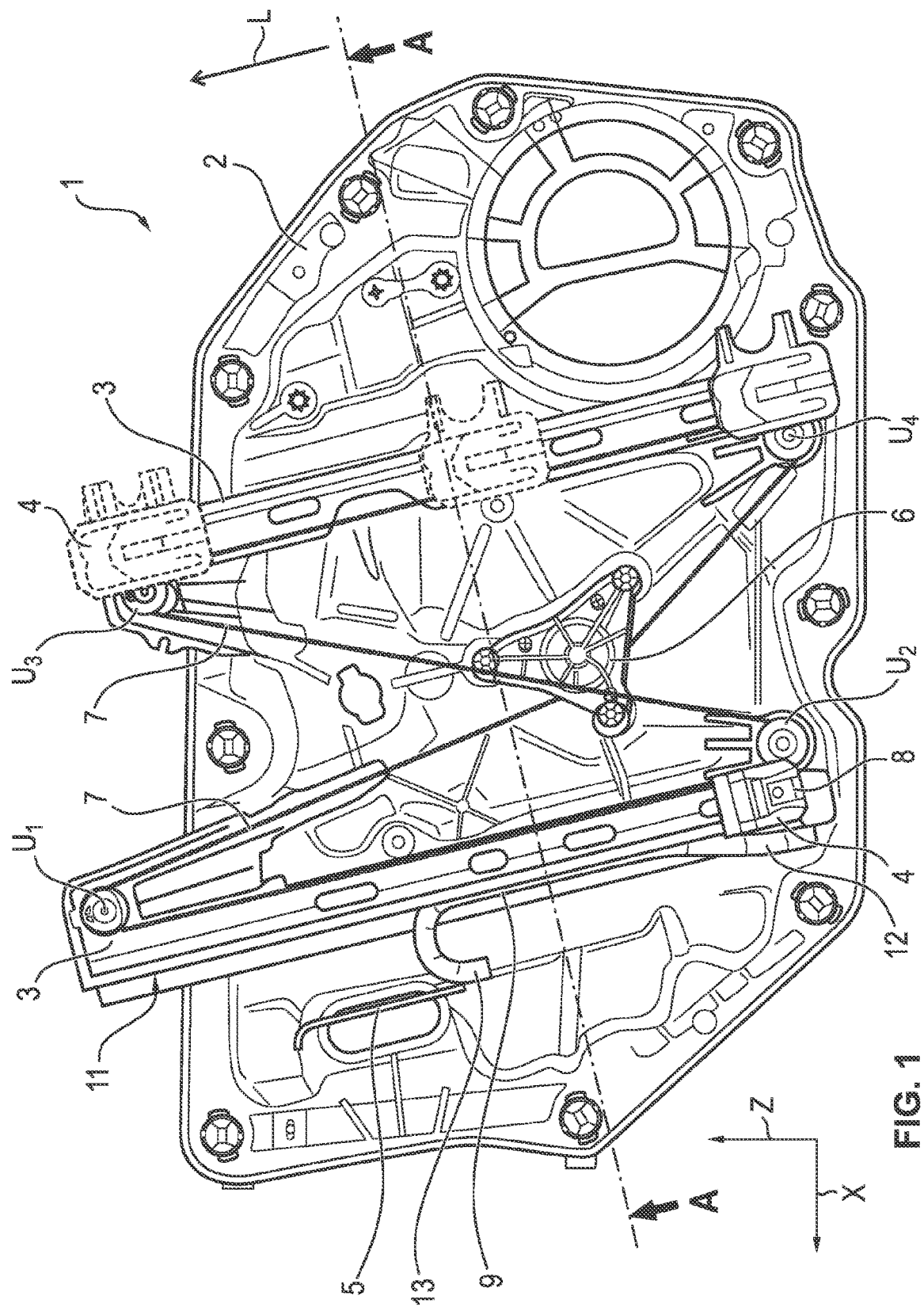
FIG. 1 is a diagrammatic, elevational view of an assembly of a two-strand cable-type window opener with a component (guide component) disposed along a guide rail for receiving or for guiding a cable and/or a number of lines for controlling and/or current supply of a functionalized windowpane which is held or can be fastened (can be mounted) on drivers guided along the guide rails.
Figure 2:
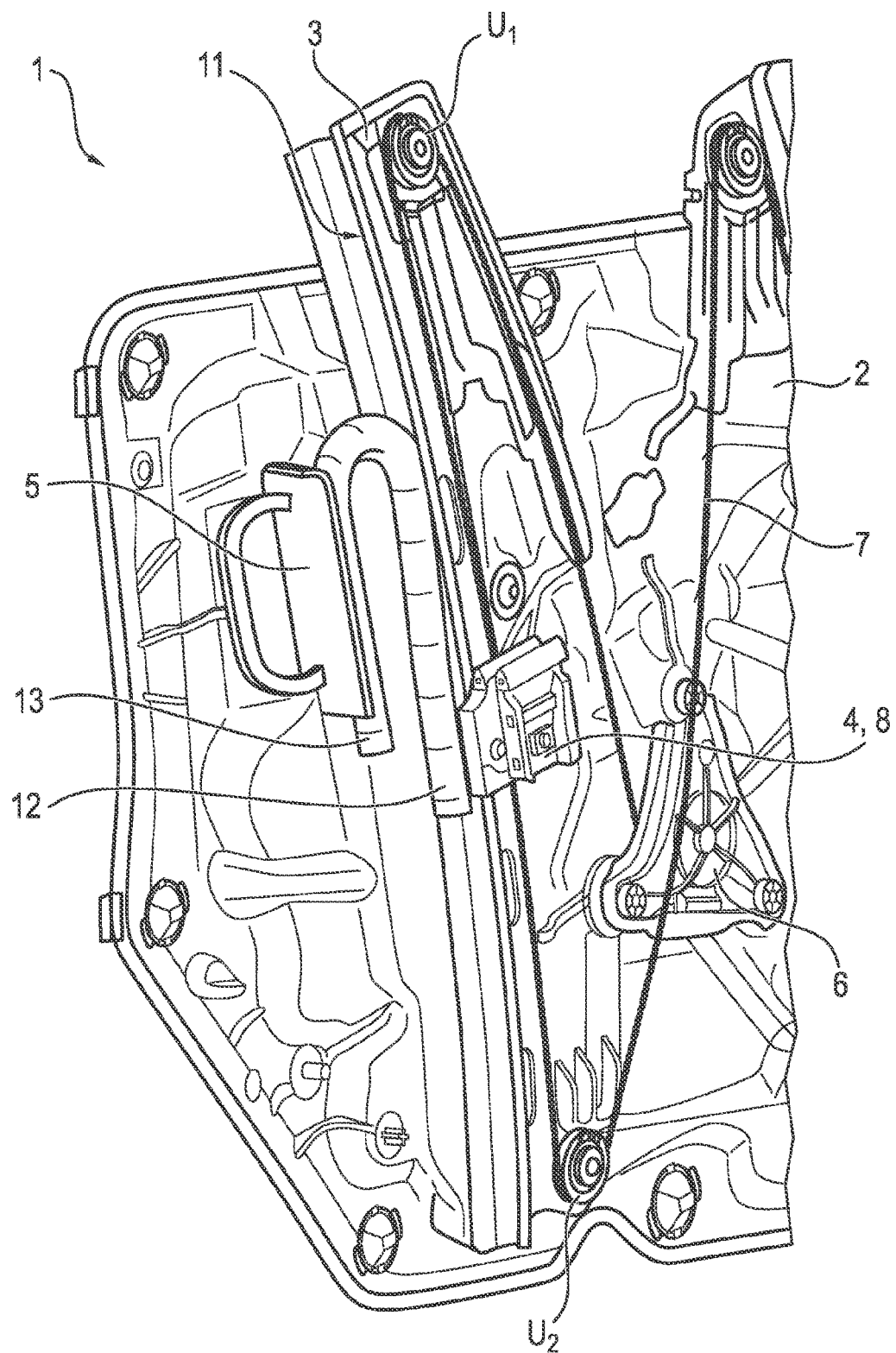
FIG. 2 is a fragmentary, perspective view of a detail from FIG. 1 with the component (guide component), which is also referred to below as a corrugated tube, in an installation position.
Figure 3:
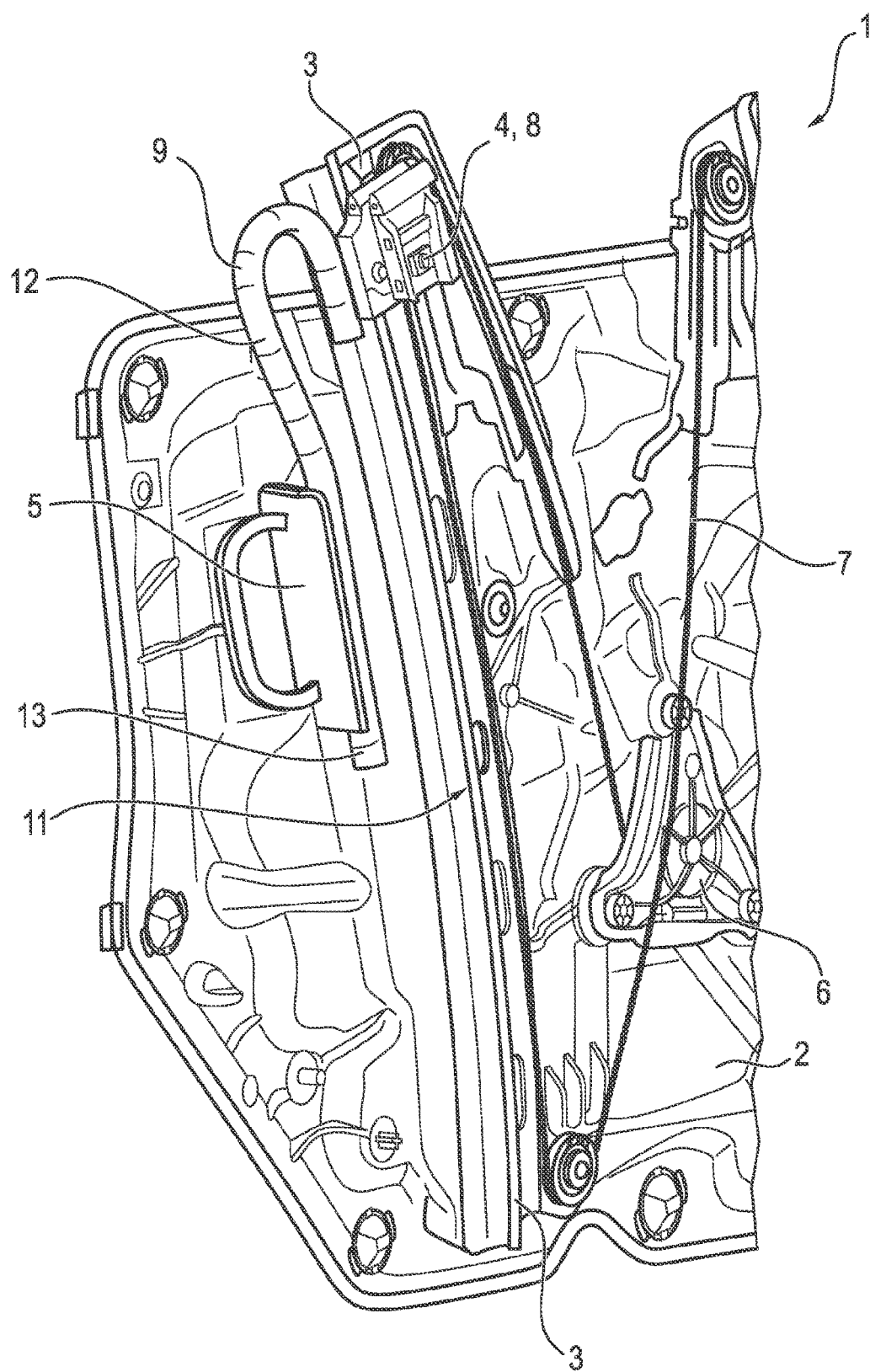
FIG. 3 shows the detail from FIG. 1 in a perspective illustration with the component (guide component) in an upper lifting position.
Figure 4:
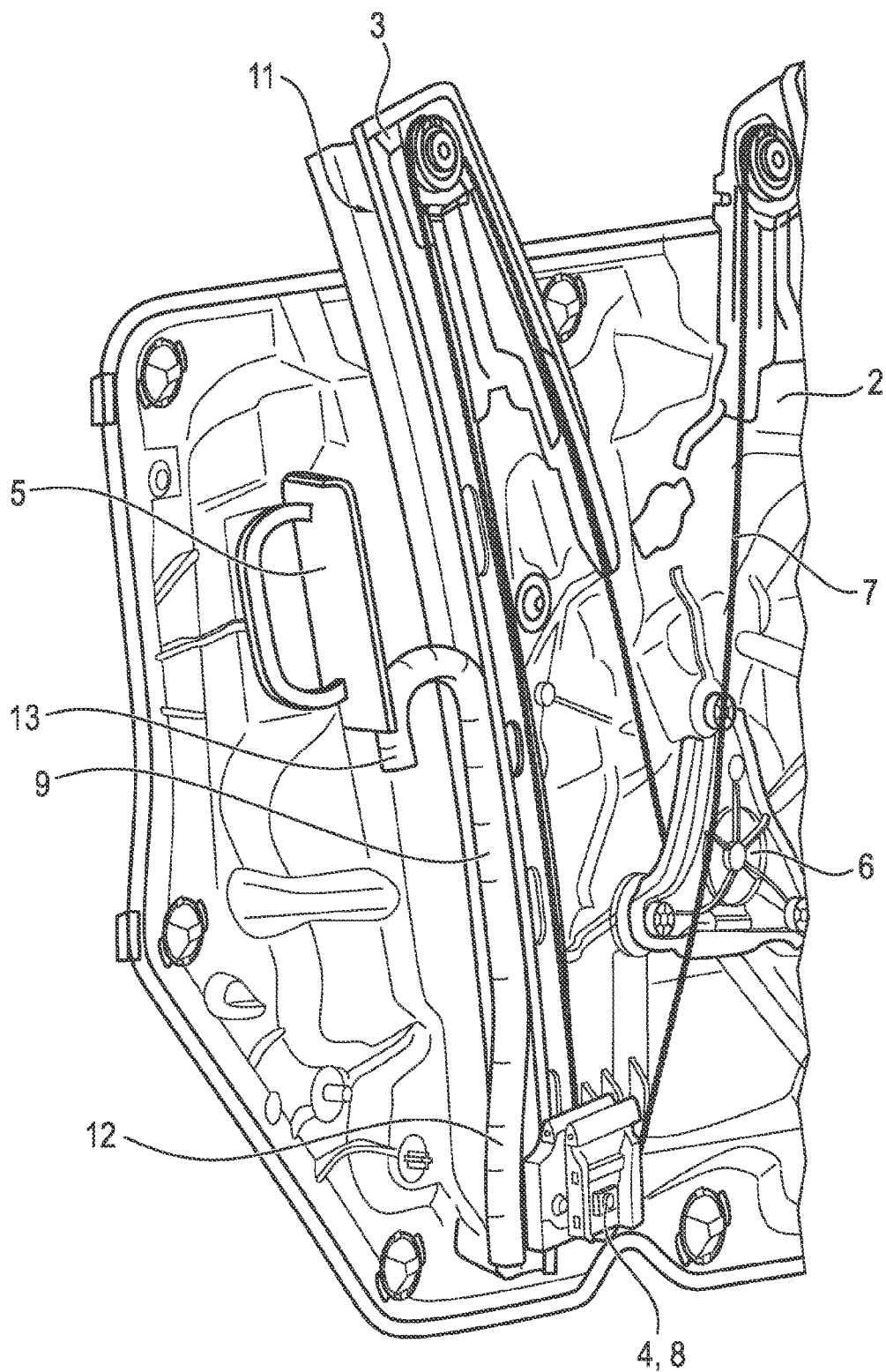
FIG. 4 shows the detail from FIG. 1 in a perspective illustration with the component (guide component) in a lower lifting position.
Figure 5:
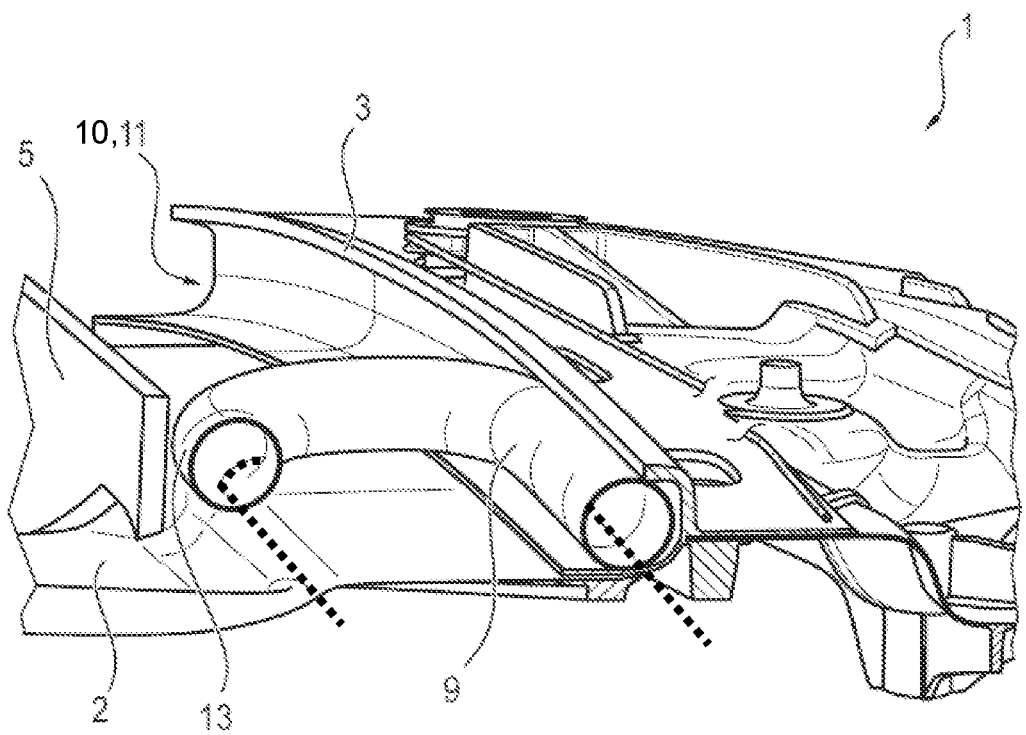
FIG. 5 is a fragmentary, perspective view (sectional illustration) of the component (guide component, corrugated tube) lying partially with one limb in a longitudinal groove or longitudinal flute in one of the guide rails and lying with the other limb against a supporting, holding or guide contour.
Figure 6:
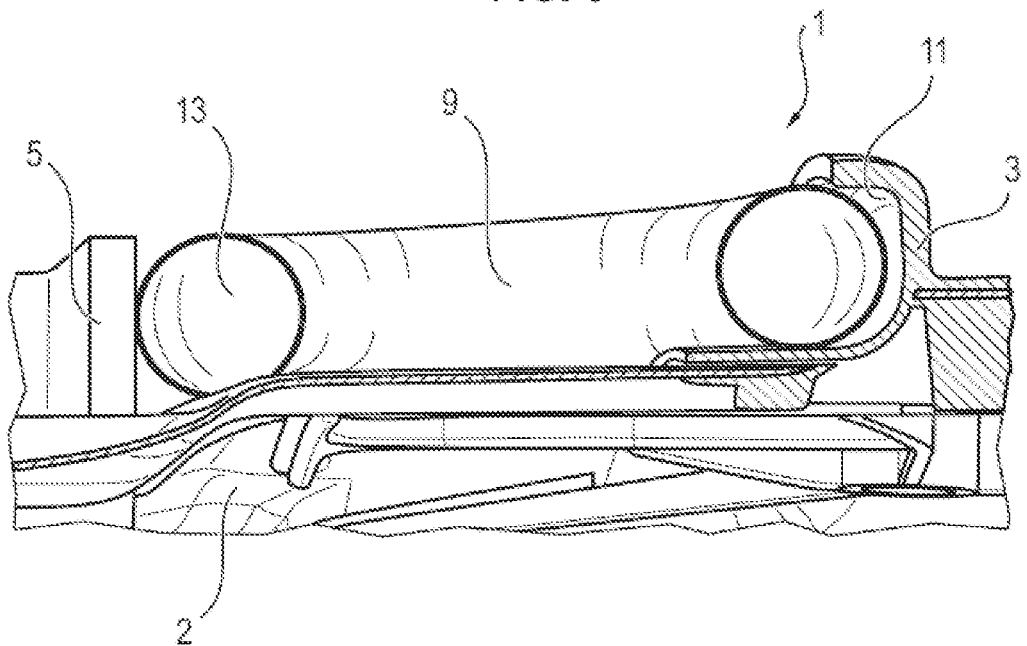
FIG. 6 is a further fragmentary, perspective view (sectional illustration) of the component (guide component, corrugated tube) lying partially with one limb in a longitudinal groove or longitudinal flute of one of the guide rails and lying with the other limb against a supporting, holding or guide contour.

Referring now in detail to the figures of the drawings, in which mutually corresponding parts and sizes are always provided with the same reference signs, and first, particularly, to FIGS. 1 to 4 thereof, there is seen an assembly 1 as part of an adjustment device of a motor vehicle, with a carrier plate (module carrier) 2, for example of a door module. FIG. 1 specifically shows a two-strand window opener assembly which is also referred to below as a window opener and is shown partially (in detail form) in FIGS. 2 to 4.

Details regarding the spatial directions are also specified below in particular in a coordinate system of the motor vehicle (vehicle coordinate system) with respect to an exemplary fitting situation of a window opener in a side door of the motor vehicle. The abscissa axis (X axis, X direction) is oriented in this case along the longitudinal direction of the vehicle (driving direction), the ordinate axis (Y axis, Y direction) along the transverse direction of the vehicle, and the applicate axis (Z axis, Z direction) along the height of the vehicle.

The assembly 1 has a first guide rail 3 and a second guide rail 3 which is parallel to the first guide rail and on which a driver (rail slider) 4 is in each case guided slidably in the longitudinal direction L of the rail. The respective guide rail 3 is disposed (mounted) on the carrier plate 2. A supporting or holding contour 5 is provided or disposed on the carrier plate 2. The supporting or holding contour is located at a distance from the left guide rail 3 in the figures.

An electromotive drive (cable drive) 6 is coupled to a cable drum on which a traction cable 7, which is connected to the drivers 4 and is guided through rail-side deflecting elements U1 to U4, is wound as a loop in such a way that, during the operation of the window opener, one cable end is unwound from the cable drum and the other cable end is unwound. In this way, adjustment of a windowpane, not illustrated, which is connected to the driver 4 takes place in order to move the same in the mounted state along the adjustment path between a closed position and an open position (opening point). The windowpane in this case is a functionalized, in particular electrically switchable or controllable, windowpane. The latter expediently has an electric contact point as a terminal connection region which corresponds to a terminal connection region 8 of the driver 4.

Furthermore, the assembly has a flexible, i.e. an elastic, in particular flexurally elastic, component 9 for guiding a cable or lines connected or connectable to the functionalized windowpane. A cable is understood herein as meaning a number of lines, in particular surrounded by a cable or insulating sheath, for conducting a current and/or for controlling the windowpane. The cable is coupled in a suitable manner to or at the driver 4 which, for its part, is coupled or connected to, and/or makes electrical contact with, the terminal connection region of the windowpane.

The flexible (elastic) component 9 is preferably configured in the manner of a drag chain and as a hollow tube. The cable or the or each line is accommodated in a suitable manner at least over part of its length, i.e. in sections, in the interior of the flexible component 9. The flexible component 9 can be manufactured from plastic and/or embodied (configured) as a corrugated tube. The flexible component 9 preferably completely surrounds the corresponding cable or line portion. The cross-sectional area of the component is expediently round, e.g. circular, but may also be angular, e.g. rectangular.

In an advantageous refinement, the flexible component 9 is guided on the guide rail 3. For this purpose, the guide rail 3 has a guide region 10 running in the longitudinal direction of the rail for the component 9. The guide region is a longitudinal groove or a longitudinal flute 11 which is effective as it were as a guide channel in which the flexible component 9 lies over part of its circumferential or lateral surface.

The flexible or elastic component 9 has a first component portion 12 which is held on the driver 4 or is connected thereto. Additionally or alternatively, it is provided that the flexible component 9 has a second component portion 13 which is held on, or connected to, the supporting or holding contour 5, which is disposed spaced apart from the guide rail 3. This supporting or holding contour 5 extends in the Y direction.

The cable (line) lying (accommodated) in the component 9 is clamped to one of the end-side component portions 12, 13 or to the two component portions 12, 13, in particular with strain relief, or is fastened in some other way. One of the end-side component portions 12, 13 is a component start for the entry of the cable (the respective line) and the other end-side component portion 13 or 12 is a component end for the exit of the cable (the respective line).

The assembly 9 is embodied in such a manner that the flexible or elastic component 9 has, on the driver side, a movable component portion, in particular a first end portion, and, on the carrier plate side, a (positionally fixed) component portion fixed on the carrier, in particular a second end portion. When the driver 4 is adjusted along the guide rail 3 in the longitudinal direction L of the rail, an adjustment of the movable component portion relative to the component portion fixed on the rail therefore takes place. When the driver 4 is adjusted along the guide rail 3, the movable component portion passes the component portion fixed on the carrier both in the direction of a closed position and in the direction of an open position of the windowpane at a distance oriented transversely with respect to the longitudinal direction L of the rail—i.e. in the X direction. In other words, with reference to the typical (conventional) vehicle coordinate system, the movable component portion moving in the Z direction passes the component portion fixed on the carrier at a distance extending in the X direction.

As is apparent from FIGS. 2 to 6, the flexible or elastic component 9 is guided in the X direction and in the Y direction, i.e. preferably both in the X direction and in the Y direction, by using the supporting or holding contour 5. The component 9 lies stably in this case in the XZ plane of the carrier plate and preferably cannot yield in the Y direction.

The claimed invention is not restricted to the exemplary embodiments described above. On the contrary, other variants of the invention can be derived by a person skilled in the art therefrom within the scope of the disclosed claims without departing from the subject matter of the claimed invention. In particular, furthermore, all of the individual features described in conjunction with the various exemplary embodiments within the scope of the disclosed claims can also be combined in some other way without departing from the subject matter of the claimed invention.

In addition, the described solution can be used not only in the specifically illustrated application, but also in a similar embodiment in other motor vehicle applications, for example in the case of an adjustable sliding roof in the vehicle.

The following is a summary list of reference numerals and the corresponding structure used in the above description of the invention.

List of Reference Signs

1 Assembly
2 Carrier plate/module carrier
3 Guide rail
4 Driver/rail slider
5 Supporting/holding contour
6 Cable/drive
7 Traction cable
8 Terminal connection region
9 Component
10 Guide region
11 Longitudinal groove/flute
12 First component portion
13 Second component portion
L Longitudinal direction of the rail
U1-4 Deflecting element

The invention claimed is:

1. An assembly of an adjustment device of a motor vehicle, the assembly comprising:
 a carrier plate;
 at least one guide rail disposed on said carrier plate;
 a driver guided displaceably on said guide rail and configured for a functionalized or electrically switchable or controllable windowpane; and a flexible component for guiding a cable connected or to be connected to the functionalized windowpane for at least one of conducting a current or controlling the functionalized windowpane;

wherein said guide rail having a guide region running in a longitudinal direction of said guide rail and being formed as a longitudinal groove or flue in which said flexible component lies, and wherein said flexible component is at least one of:
configured as or effective in a manner of a drag chain, or
configured as a hollow tube or in a manner of a hollow tube.

2. The assembly according to claim 1, wherein said flexible component is at least one of:
configured as or effective in a manner of a drag chain, or
configured as a hollow tube or in a manner of a hollow tube, or
provided with an interior accommodating at least part of a length or sections of the cable.

3. The assembly according to claim 1, wherein said flexible component at least one of:
is manufactured from plastic, or
is a corrugated tube, or
surrounds the cable at least in sections or at least approximately completely.

4. The assembly according to claim 1, wherein said flexible component is guided at least one of on or under said guide rail.

5. The assembly according to claim 1, wherein said flexible component has a first component portion or a first end-side component portion being held on said driver or connected to said driver.

6. The assembly according to claim 5, which further comprises a supporting or holding contour disposed on said carrier plate.

7. The assembly according to claim 6, wherein said supporting or holding contour is spaced apart from said guide rail.

8. The assembly according to claim 7, wherein said flexible component has a second component portion or a second end-side component portion being held on or connected to said carrier plate or said supporting or holding contour spaced apart from said guide rail.

9. The assembly according to claim 1, wherein:
said flexible component has a driver side with a movable component portion or a first end portion, and a carrier plate side with a component portion or a second end portion fixed on said carrier plate; and
upon said driver being adjusted along said guide rail, said movable component portion is at least one of:
adjusted in a longitudinal direction of said guide rail relative to said component portion fixed on said carrier plate, or
passes said component portion fixed on said carrier plate at a distance oriented transversely relative to the longitudinal direction of said guide rail.

10. The assembly according to claim 9, wherein said movable component portion passes said component portion fixed on said carrier plate in at least one of a direction of a closed position or a direction of an open position of the windowpane.

11. The assembly according to claim 1, wherein said flexible component is guided in at least one of an x direction or a y direction by at least one of:
a supporting or holding contour disposed on said carrier plate, with reference to a vehicle coordinate system, or
a guide component or a guide component fixed on said carrier plate.

12. A window opener of a motor vehicle, the window opener comprising an assembly according to claim 1.

* * * * *